Figure 1:
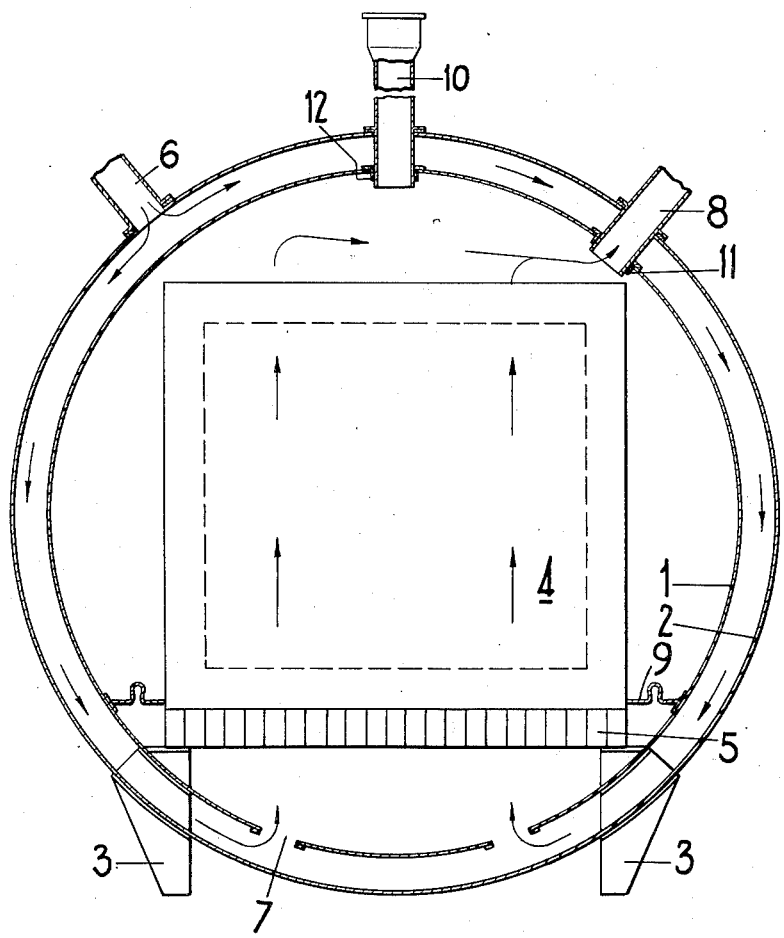

Fig. I.

Aug. 22, 1961  R. N. MILLAR ET AL  2,997,435
PRESSURE VESSELS

Filed May 31, 1956  5 Sheets-Sheet 4

INVENTORS
Robert Neil Millar
Keith James Mitchell

BY
Kirschstein, Kirschstein & Ottinger

ATTORNEYS

United States Patent Office 2,997,435
Patented Aug. 22, 1961

2,997,435
PRESSURE VESSELS
Robert Neil Millar, Peets Wood, and Keith James Mitchell, Northfleet, England, assignors to The General Electric Company Limited, London, England, a British company
Filed May 31, 1956, Ser. No. 588,406
Claims priority, application Great Britain May 31, 1955
6 Claims. (Cl. 204—193.2)

This invention relates to pressure vessels and more particularly, but not exclusively, to pressure vessels of thermal reactors, a pressure vessel of such reactors containing a core or body including or formed of moderating material or materials for the fuel elements and having passages, ducts or the like for the flow of gaseous fluid cooling medium which is arranged to abstract heat from the fuel elements. The medium may pass to heat exchangers or to atmosphere after cooling the said elements and if it is passed to heat exchangers, the heat given up by the medium may be used to generate steam for use in turbo-alternator plant.

In order to improve the cooling or rate of heat transfer from the fuel elements, it is standard practice to employ within a pressure vessel gas at relatively high pressure (say 100–200 lbs. per sq. in.) and difficulty is experienced in the design of a pressure vessel which, while capable of withstanding the necessary gas pressure and working temperature, has a reasonable wall thickness to enable practical considerations such as assembly and construction on site to be dealt with by relatively conventional and well known constructional methods.

One object of the present invention is the provision of a pressure vessel for thermal reactors such as nuclear power thermal reactors, which overcomes, at least in part, this particular difficulty.

According to the present invention, a pressure vessel of say a thermal reactor is constructed in the form of two or more shells or walls, one within the other, the inner or innermost shell or wall being arranged to contain gaseous fluid medium under pressure and the space or spaces between the shells or walls being also arranged to contain fluid medium.

The fluid medium contained between the shells or walls may also be gaseous fluid medium and the medium may be common to the inside of the interior shell or wall and to the space or spaces between the shells or walls. Alternatively, the space or spaces may be separated from the inside of the said inner or innermost shell or wall.

If the pressure vessel is that of a thermal reactor, gaseous fluid cooling medium will flow through the inside of the inner or innermost shell or wall to cool the fuel elements within the core or body of the reactor and the medium may first flow through the space or spaces between the shells or walls of the pressure vessel.

Each shell or vessel may be spherical, cylindrical or other convenient and suitable shape and all the shells or walls of a vessel may be of similar shape. Thus, a pressure vessel may conveniently comprise two spherical shells one within the other.

In order that the invention may be clearly understood, five constructions of pressure vessels of nuclear power thermal reactors will now be described by way of example with reference to the five figures of the accompanying drawings which are largely diagrammatic. Each figure shows a central vertical section through a pressure vessel and, for simplicity, like parts in the figures have been given the same reference numerals.

Referring now to FIGURE 1, this figure shows a double shell pressure vessel, each shell being of spherical shape. The inner or interior shell 1 is spaced a short distance radially inwards of the outer shell 2 and both shells are supported by mountings 3. The core or body 4 of the reactor rests upon a supporting grid 5 suitably apertured for the flow of cooling gas and gas is arranged to be fed from the cool end of a heat exchanger or exchangers (not shown) by way of an entry pipe 6 to the space between the shells 1 and 2. After flowing as shown by the arrows, in the space between the shells, the gas passes into the inner shell 1 through apertures or ports 7 at or towards the bottom of the shell 1, through the grid 5 and the core or body 4 and out through an exit pipe 8 to the heat exchanger or exchangers, suitable pumping means (not shown) being provided for circulating the cooling gas. The reactor shown in the figure is of the type in which the fuel elements (not shown) are supported in vertical passages or channels (not shown) in the core or body 4 but, as will be appreciated, the same general principles are applicable to reactors with cylindrical pressure vessels and the fuel elements supported in horizontal passages or channels in the reactor core or body.

A gas sealing member 9 between the shell 1 and body 4 ensures that all the gas passes through the body and a charging tube 10 (or more than one charging tube) is provided at the top of the shells 1 and 2. Both the pipe 8 and tube 10 are rigidly secured to the outer shell 2 and slide through piston ring or similar type seals 11 and 12 respectively mounted on the inner shell 1, the seals 11 and 12 allowing for any relative radial movement between the shells and for any slight circumferential movement.

As will be appreciated, the pressure difference between the two shells 1 and 2 will be very small but the temperature difference can be quite large. The outer shell may therefore be maintained at a comparatively low temperature and this enables economies to be effected in the construction of this shell 2. Thus, a low quality steel may be used or the material of the shell may operate at high working stress. The shell 2 will need to be leak-proof and is preferably of welded construction, the pipes 6 and 8 and tube 10 being welded in position. The inner shell 1 will need to be of high quality, heat resisting material such as heat resisting steel, but may be relatively thin compared with the outer shell 2. Since the inner shell 1 does not need to be leak-proof, it may be riveted or bolted construction whereby difficulties in construction on site and associated with the welding of high quality heat resisting materials, are overcome.

Figure 2:
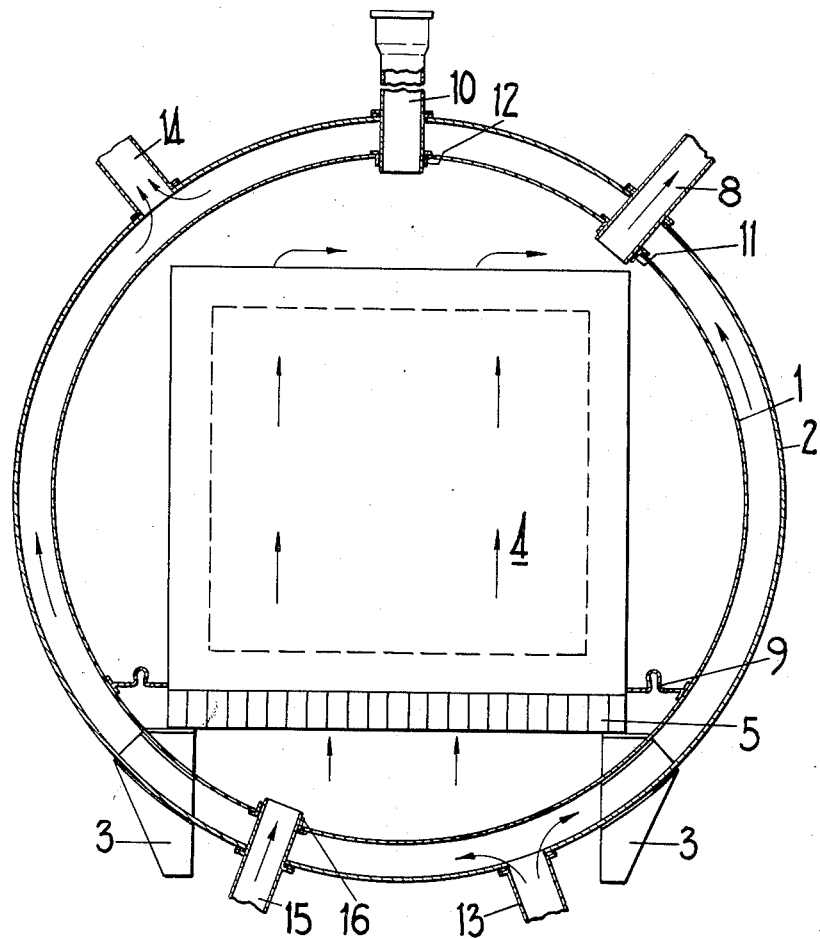

Referring now to the construction shown in FIGURE 2, this is generally similar to that shown in FIGURE 1 but instead of cooling gas first flowing through the space between the shells 1 and 2 and then into the inner shell 1, the gas flow in the said space is separate from that in the shell 1. Thus, gas flows from the heat exchanger(s) by way of an entry pipe 13 to the space between the shells and vents from the space to the heat exchanger(s) by way of the exit pipe 14. Further gas from the heat exchanger(s) enters the inner shell 1 through the pipe 15, passes through the reactor body 4 and vents to the heat exchanger(s) through pipe 8. The pipe 8, as before, has a seal 11 while the pipe 15 has a similar seal 16. The pressure of the two gas spaces of the vessel may be substantially the same or suitably different.

Figure 3:
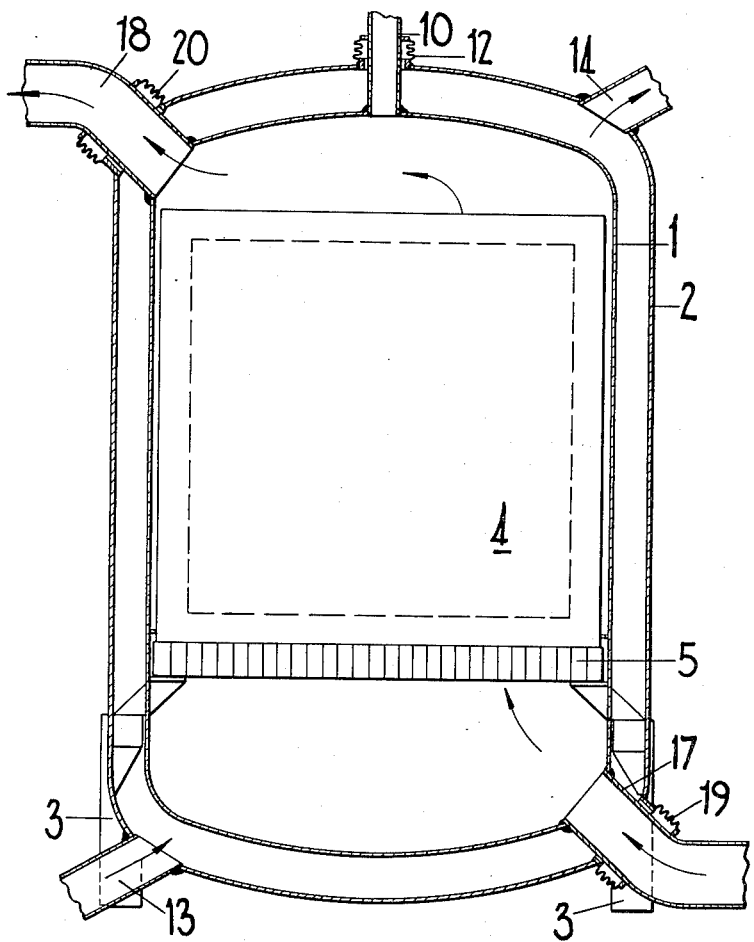

In the construction shown in FIGURE 3, a separate pressurised cooling circuit is connected or associated with the space between the inner and outer shells of the pressure vessel and by this means, a further reduction in the working temperature of the outer shell is achieved. A fully leak-proof design is required for the inner shell and referring now to the figure, which shows shells of cylindrical shape, it will be seen that the entry and exit pipes 17 and 18 respectively for the cooling gas for the inner shell 1 are rigidly attached to the inner shell 1 as by welding and are connected to the outer shell 2, not by piston ring type seals, but by corrugated metal bellows devices 19 and 20 respectively which are gas tight. Gas for the space between the shells 1 and 2 flows in by way of pipe 13 and out by way of pipe 14 and may well be a different gas from that used for cooling the fuel elements in the reactor body 4.

In this construction, advantage may be taken of the inherent strength of the inner shell 1 which would generally be of welded construction, by employing a lower pressure in the space cooling circuit, the differential between the two systems being related to the safe working stress of the inner shell 1 at its maximum working temperature. The outside surface of the inner shell 1 may be lagged or otherwise treated to reduce to a minimum heat loss to the gas in the space between the shells 1 and 2. The outer shell 2 may be of welded construction or it may be of riveted or bolted construction, the plates of the shell 2 being attached say to angle pieces welded to the inner shell 1; in this case, in order to ensure a leak-proof structure, seal welding on the inner and/or outer surface of the outer shell 2 would be adopted.

Figure 4:
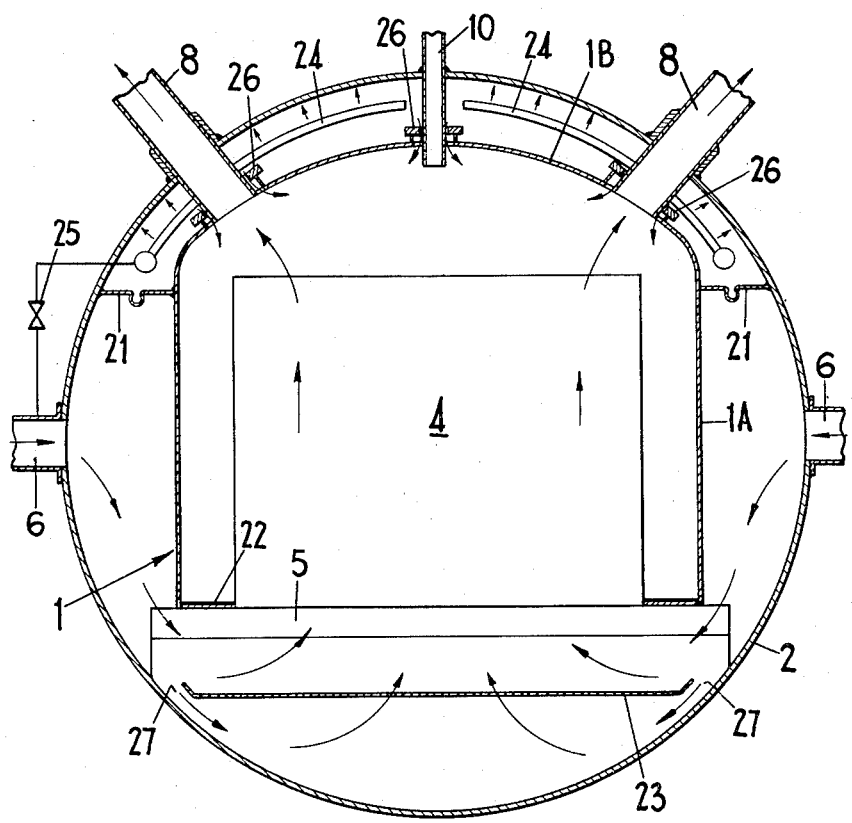
Figure 5:
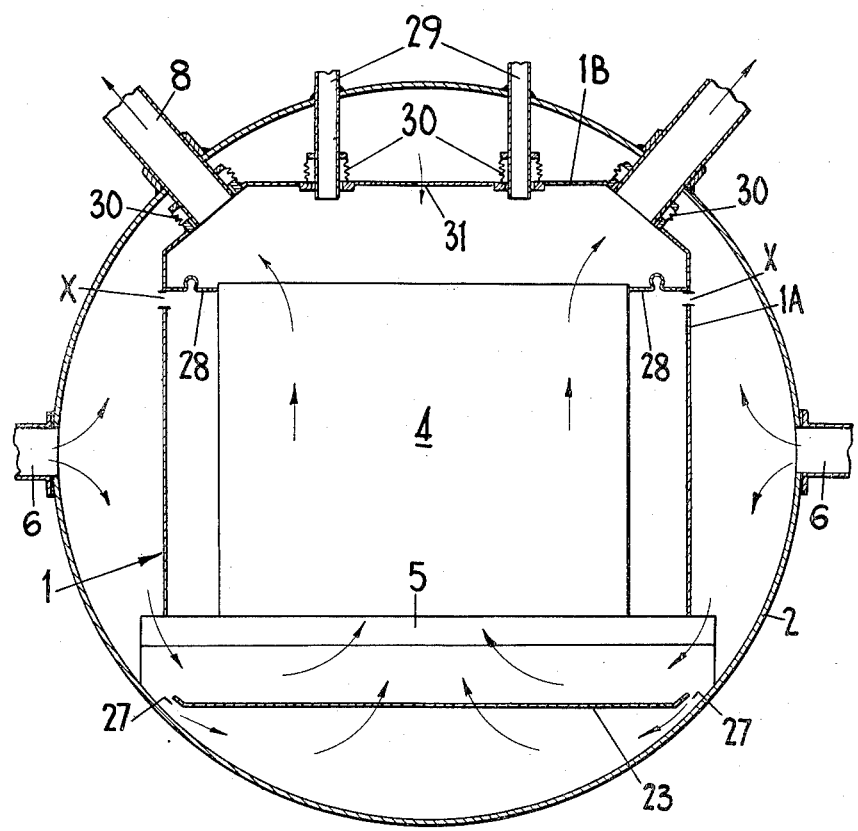

The two constructions shown in FIGURES 4 and 5 are modifications of the construction shown in FIGURE 1 and in each construction, the inner shell takes the form of an open-ended cylinder or chamber, the open end of which rests upon the grid which also supports the core or body of the reactor. Referring now to FIGURE 4, in this construction, the inner shell 1 is constructed in one piece with a vertical cylindrical section 1A welded to an ellipsoidal end section 1B. Two gas seals are provided, an outer gas seal 21 between the inner and outer shells 1 and 2 and an inner gas seal 22, between the inner shell 1 and the core 4 carried by the grid 5. Cool gas from heat exchangers (not shown) enters the space between the two shells 1 and 2 by way of entry pipes 6 and the gas, after passing through the core 4, discharges to the heat exchangers through exit pipes 8. A deflector 23 is provided beneath the grid 5 and ensures an adequate flow of gas for cooling the bottom of the outer shell 2 whilst a number of perforated internal distribution pipes 24 fed from the cool gas supply through a valve or valves 25, are provided above the top of the inner shell 1.

The inside of the inner shell 1 is all at the lower gas outlet pressure and since the distribution pipe system is provided with a control valve(s), it is possible to regulate externally the rate of leakage from the outer to the inner shell. It is, therefore, possible to provide simple mechanical seals 26 for all the pipes and tubes 8 and 30 passing through the end section 1B of the inner shell 1, these seals being only provided as a precaution against the possibility of failure of the outer gas seal 21 serving to restrict flow in the upper section between the inner and outer shells 1 and 2.

It will be appreciated that a main purpose of the double shell construction is to isolate the outer stress bearing shell 2 from the high temperature of the outlet gas from the reactor. The leakage of cool gas through the distributing pipe system is arranged to avoid the gradual increase in temperature of the gas in the upper zone between the inner and outer shells 1 and 2, as a result of heat transfer through the end section 1B of the inner shell 1, and as a result of neutron heating of the outer shell 2.

The deflector 23, which for reasons not connected with the design of the pressure vessel, is a necessary addition, is in the form of a flat plate beneath the core structure and in order to prevent a build up of temperature in the zone beneath this flat plate as a result of neutron heating, an annular groove 27 is provided around the circumference of the plate which is itself pierced with a number of holes for cooling gas. In this way the velocity of the incoming cool gas from the heat exchangers causes a circulation of gas in this bottom zone.

Referring now to FIGURE 5, in this construction, the inner shell 1 consists of a vertical cylindrical section 1A with an end section 1B formed from a flat plate and part of a cone. Only one gas seal 28 is provided at the top of the core 4 between the core 4 and the inner shell 1 and below this level, the inner shell 1 is split at X to allow top and bottom sections 1A and 1B to move independently as a result of thermal expansions. The flat end of the inner shell 1 is supported in a number of tubes 29 which are attached to the outer shell 2 and passed downwards through the inner shell 1. The method of support, however, is such as to allow the inner shell 1 to move independently of the tubes 29, and in order to achieve a gas seal, a bellows 30 is provided at each of these points and also at the points where the hot gas pipes 8 emerge from the inner shell 1. In this case, only the upper part of the inner shell 1 above the gas seal 28 is at the lower gas outlet pressure and the rate of leakage which is required, just as in the case of the construction shown in FIGURE 4, is achieved by simply providing holes 31 through the flat end of the inner shell 1, the size and distribution of the holes being the only means to determine the actual rate of leakage.

The flat deflector plate 23 is again provided beneath the core 4 and the design and function is identical to that described with reference to FIGURE 4. It will be appreciated that in this construction, the transition from low to high temperature on the inner shell 1 takes place rather more abruptly than in the construction shown in FIGURE 4, and this, together with the method of support of the flat end, makes the split design for the inner shell 1 necessary. One drawback of the construction is that there is no possibility of modifying the rate of leakage from outer to inner shells once the reactor is put in operation.

It will be appreciated from the above description, that the outer shell is, as it were, heat protected from the reactor body or core by the inner shell and it is intended that within the scope of the invention there shall be included a pressure vessel for a thermal reactor having an outer shell protected by a heat resistant lining spaced from the shell, cooling medium being arranged to flow between the lining and the outer shell.

We claim:

1. In a pressurized gas-cooled nuclear reactor: an outer pressure-resistant enclosing shell, an apertured supporting grid contained within said outer shell, an internal heat-resistant cylindrical shell member supported in spaced relation to said outer shell and with its open base in substantially close proximity to said supporting grid, a heat-resistant end member arranged substantially to close the top end of said cylindrical member, means arranged for the introduction of a main supply of cooling gas into said outer shell, means arranged for the passage of cooling gas from said cylindrical and end member combination and out through said outer shell, gas sealing means arranged to ensure that substantially all said main supply of cooling gas should be diverted upwards through said supporting grid, an apertured gas deflector member interposed between said open base and the outer shell and arranged below said supporting grid, and means providing openings for the flow of a relatively small quantity of cooling gas inwards through said cylindrical and end member combination.

2. A combination as set forth in claim 1, wherein gas sealing means is interposed between the said cylindrical and end member combination and said outer shell, and wherein means are arranged for the introduction, above said sealing means and between said end member and said outer shell, of an auxiliary supply of cooling gas, said means for said relatively small flow of cooling gas being arranged to permit passage of gas from said auxiliary supply.

3. A combination as set forth in claim 2, wherein the said means for introduction of an auxiliary supply of cooling gas comprises a distribution pipe system, control means being provided to control the quantity of auxiliary gas supply.

4. For a pressurized gas-cooled nuclear reactor, an outer pressure-resistant enclosing shell, an apertured supporting grid contained within said outer shell, a heat-resistant cylindrical shell member supported at its open base by the said grid in spaced relation to the outer shell, a heat-resistant end member arranged substantially to close the top end of said cylindrical member, means arranged for the introduction of a main supply of cooling gas into said outer shell, gas sealing means between the top end of said cylindrical and end member combination and the outer shell, whereby in operation substantially all said main supply of cooling gas is diverted through said open base of the cylindrical member, an apertured deflector member interposed between the said open base and the outer shell and adapted to be swept on top and bottom surfaces by cooling gas, means arranged for the passage of cooling gas through said end member directly to the outside of said outer shell, means arranged for the introduction, above said sealing means and between said end member and said outer shell of an auxiliary supply of cooling gas, and leakage means in said end member adapted to permit leakage of said auxiliary cooling gas through said end member.

5. A combination as set forth in claim 4 wherein the leakage means is arranged as part of a mechanical sealing means between the end member and the means for the passage of cooling gas through said end member directly to the outside of the outer shell.

6. A combination as set forth in claim 4 wherein the means for the introduction of an auxiliary supply of cooling gas comprises a distribution pipe system, control means being provided to control the quantity of auxiliary gas supply.

References Cited in the file of this patent

UNITED STATES PATENTS

| | | |
|---|---|---|
| 2,743,225 | Ohlinger et al. | Apr. 24, 1956 |
| 2,778,792 | Szilard | Jan. 22, 1957 |
| 2,780,596 | Anderson | Feb. 5, 1957 |
| 2,782,158 | Wheeler | Feb. 19, 1957 |
| 2,840,522 | Young et al. | June 24, 1958 |

FOREIGN PATENTS

| | | |
|---|---|---|
| 1,113,339 | France | Dec. 5, 1955 |

OTHER REFERENCES

Atomics, February 1956, pages 47 and 48.

A.E.C.D. 3731, Oct. 14, 1955, pages 29–31, 32, 33 and 34.

A.E.C.U. 3170, pages 9–11 dated 1955).

(These two Atomic Energy Commission Documents are available from U.S. Atomic Energy Commission, Technical Information Extension, Oak Ridge, Tennessee.)